United States Patent [19]

Rouhani

[11] Patent Number: 4,823,294
[45] Date of Patent: Apr. 18, 1989

[54] SINGLE-HAND COMPUTER KEYBOARD

[76] Inventor: S. Zia Rouhani, 3028 Hartert Dr., Idaho Falls, Id. 83401

[21] Appl. No.: 901,431

[22] Filed: Aug. 28, 1986

[51] Int. Cl.⁴ .................... G06F 3/02; H03K 17/94; H04L 15/08

[52] U.S. Cl. .................. 364/709.12; 178/87; 341/23

[58] Field of Search .............. 364/708, 709; 178/87; 340/365 R; 400/479

[56] References Cited

U.S. PATENT DOCUMENTS

| | | | |
|---|---|---|---|
| 717,966 | 1/1903 | Bourk | 178/87 |
| 3,833,765 | 9/1974 | Hilborn et al. | 178/79 |
| 3,937,939 | 2/1976 | Frankel | 364/709 |
| 4,360,892 | 11/1982 | Endfield | 364/900 |
| 4,555,193 | 11/1985 | Stone | 340/365 R |
| 4,668,194 | 5/1987 | Naryanan | 364/709 |

OTHER PUBLICATIONS

Niederreiter, "Single Key Element Data Input", IBM Technical Disclosure Bulletin, vol. 19, No. 7, Dec. 76, pp. 2585–2586.

*Primary Examiner*—Gary V. Harkcom
*Assistant Examiner*—Long Thanh Nguyen

[57] ABSTRACT

A miniaturized single-hand keyboard for computers or electronic word processing systems comprising alphabetical, numerical, and programmable keys. The keyboard is used in conjunction with a keypointer which presses any of the keys on the keyboard. The keypointer has a number of keys such as a shift key, control key and an alternate key, which are activated by pressure of the thumb or the index finger.

18 Claims, 2 Drawing Sheets

SINGLE-HAND COMPUTER KEYBOARD

BACKGROUND OF THE INVENTION

1. Field of Invention

This invention relates to a data entering system for electronic computers and word processors, in particular through hand operation with a keypointer on a miniaturized typewriter-type keyboard. There are three major fields of use for this invention:

a. As an input console for any stationary computer terminal or personal computer. The advantages of using a one-handed miniature keyboard are its very limited space requirement and freedom of one hand for other chores.

b. As a complete and useful keyboard for handicapped people who can use only one hand.

c. As an input console for compact, portable computers (pocket-size or larger). The obvious advantage of the miniature keyboard in such applications is the very light weight and ease of operation in many situations, with access to all functions of a conventional keyboard.

2. Description of the Prior Art

The recent developments in computer hardware, in particular increased memory and storage capacity on very small chips or disks, have contributed to an expanded usage of computers for a variety of different tasks. With all the advances in data storage and internal communication in computers, other than voice activated computers there have not been major changes in communication between human and computer. The ordinary typewriter-type keyboards that demand usage of both hands for speedy data entry are still the standard approach. While well trained typists may be able to enter data through these keyboards at a high rate, the average computer user has a low rate of data entry through manual key punching. Additionally, one must occasionally engage both hands, at least for use of the shift key on one side of the keyboard or the other. Another noticeable disadvantage of prior art keyboards is their bulky structure which occupies a major portion of the working area on a desk, where one must have other materials for reading or writing. The disadvantage of this system may be visualized by considering situations where one tries to read information or data from a drawing or a chart and simultaneously enter such data into a computer. With the present bulky keyboards it is necessary to go back and forth between two desk areas, or even two different desks, which makes the data entry process slow and cumbersome. The need for a one-hand keyboard has been a motivation for the creation of several patented devices in this field. U.S. Pat. No. 3,833,765, issued to Hilborn et al., describes a one-hand operated keyboard that employs different key combinations for communicating with the computer U.S. Pat. No. 4,360,892, issued to C. Endfield, describes a portable word-processor that employs only a few keys through which one can enter combinations of dots that represent the shapes of different alpha-numerical characters. Another solution to this problem is suggested in U.S. Pat. No. 4,555,193, issued to P. J. Stone. This solution is based on the use of a reduced number of keys with different color coding to simplify the key combinations for entering different characters.

Most prior art products that recognize the two-handed problem of typewriter-type keyboards are based on the use of combinations of different key strokes for entering various alpha-numerical data into the computer in a coded manner. Nowhere in the prior art is there a suggestion to combine a complete miniaturized alpha-numerical keyboard with a keypointer that embodies a number of the necessary control keys to enable one-handed control of the keyboard.

SUMMARY OF THE INVENTION

The present invention comprises a very compact typewriter type keyboard that provides all necessary key functions within an area of about two to ten square inches, all within the reach of a pen-like keypointer that is adapted to be used by one hand. The keypointer is connected to the keyboard through control wires, with the functions of the shift key and one or several additional control keys being built therein. These keys are in the form of buttons positioned to make them operable by pressure of the thumb or other fingers.

The objective of this invention is to eliminate the need for engaging fingers of both hands in the process of data entry through keyboards, while providing a compact keyboard having keys too small to be finger-operated.

Another object is to provide a complete and expanded set of keys that individually cover all characters of the alphabet, number digits, typing symbols, and programmable function keys, all within reach of the tip of a keypointer that can be manipulated by the fingers of one hand.

A further object of this invention is to provide a complete keyboard that requires only a small desk area, about ten square inches.

DETAILED DESCRIPTION OF THE INVENTION

Figure 1:
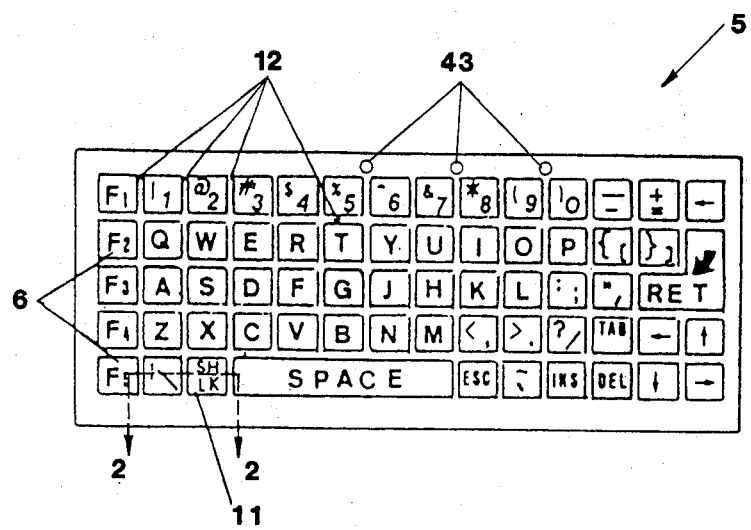
FIG. 1 is a plan view of a suggested keyboard layout.
Figure 2:
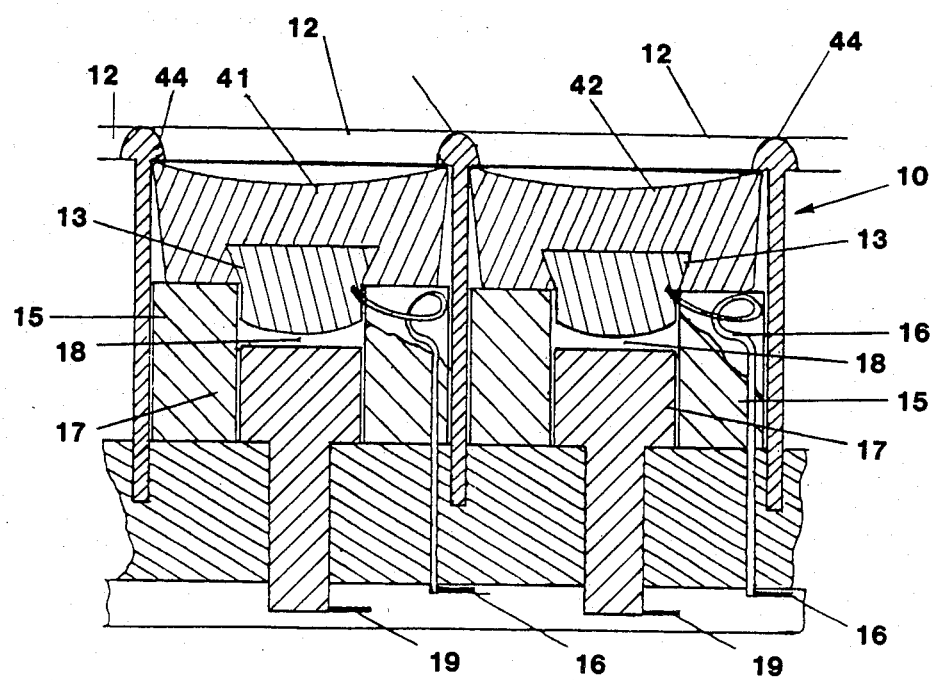
FIG. 2 is a partial cross-sectional view of the mechanism of two keys, taken along line 2—2 of FIG. 1.

FIG. 1 is a top view of the inventive reduced size keyboard, generally indicated at 5 according to the present invention. It includes all typical typewriter keys, five function keys, 6, F1 through F5, and several other familiar keys, including a toggling shift-lock key 11. The arrangement of keys on this board is for the most part similar to that of a conventional typewriter keyboard. However, the shift key is absent and the key size is much smaller, measuring about one-fourth inch square. The keys are placed close to one another, within a matrix of support walls 12 that keeps them separated from each other. As shown in FIG. 2, the walls 12 not only surround the periphery of the keys but also provide a restraining barrier 44 which extends above the key top to prevent unintentional slippage of the keypointer from the intended key to an adjacent key. The actual dimension of this keyboard can preferably be approximately 1.5"×5.5", but the keyboard can be larger or smaller, the primary limitations being visual perception of distinct keys and space constraints in the workplace. In normal finger operation, typewriterstyle, the keys of this keyboard would be much too small to be individually operable, hence the need for the keypointer of the present invention.

Figure 3:
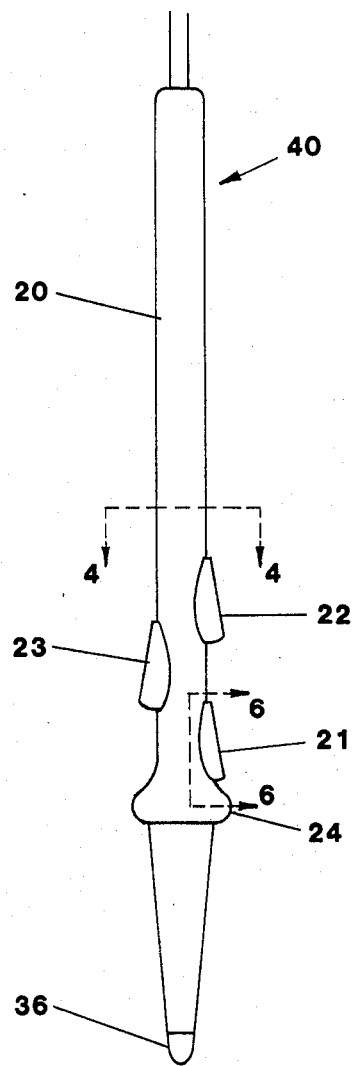
FIG. 3 is the keypointer of the present invention.

The important functions of the shift key, or control key, and possibly other keys, are built into the keypointer, generally indicated at 40 of FIG. 3. Most or all of the keys shown in FIG. 1 can be provided with at least two functions, one activated by simple depression of the key and other function or functions being activated by depression of the key while the shift key 21, or another of the keypointer keys, on the side of the keypointer 40 is depressed at the same time. For instance, the letter keys will produce lower case letters by simple depression and upper case letters when depressed either following or while depressing the shift key 21.

The size, pattern, and arrangement of the key functions shown in FIG. 1 are merely exemplary of many possible embodiments of the present invention. The actual size, number, and arrangement of the keys may be made in any manner desired to suit the particular purpose.

FIG. 2 shows an enlarged cross-section of two adjacent keys, 10 and 11, with the thin dividing walls 12, between and around them.

The keytops 41 and 42 are made of any suitable nonconducting material, such as plastic, and each has affixed to the lower side thereof a metallic contact point 13. The keytops are held in place by the thin walls 12 surrounding them above and on the sides, and a collar of some elastic material 15 underneath. The elastic collar 15 may be made of compressed rubber or it can comprise individual springs. Each of the contact points 13 has a flexible electric wire 16 attached to it, and is positioned above a corresponding fixed metallic contact point 17. The air gap 18 between the two contact points is relatively narrow, possibly only a few hundredths of an inch, and can be easily closed by a slight pressure or impact on the keytop. The circuit is normally open due to the elastic pressure of the collars 15. Each fixed contact point 17 has a separate wire 19 attached to it and, when the gap under a key is closed, an electric circuit is established and the appropriate character is transmitted from the keyboard to the computer or word processor (not shown). Each circuit of this kind relates to one specific character or code in the computer.

It is to be understood that the embodiment shown in FIGS. 1 and 2, and described above, is only a representative example of one possible embodiment of the present invention. The intended result of depressing of the keys, i.e., to effect data processing, such as in a computer, word processor or electronic typewriter, resulting either in a readout or in printing for data storage, may be accomplished by a variety of other well-known electro-mechanical or electronic arrangements. The present invention resides in the inclusion of the functions of the shift, control, and other keys in a keypointer pen that is described below.

FIG. 3 illustrates the pen-like keypointer 40 that is similar to an ordinary pencil in size. The keypointer as described herein is preferably electrically connected to the keyboard and provided with control keys. However, the keyboard as described above can be operated with a keypointer whose sole function is to operate the keys of the keyboard. There can be any number of keys built into the keypointer. As represented in FIG. 3 and hereinafter, there are three keys built into the keypointer; it is understood that any practicable number of keys can be included therein. As illustrated, the three keys comprise the shift key 21, the control key 22, and an alternative key 23. A short flared-out segment 24 of the keypointer is provided with an enlarged diameter in order to provide a steady support for the fingers holding the keypointer.

The shift key 21 can be positioned lower than the other keys, immediately above the finger rest 24, in order to have it constantly covered by the thumb, which will rest on segment 24 when the keypointer is held in the hand for typing. The control key 23 is positioned closely above the shift key such that it is normally free of contact with the thumb but can be reached easily by the thumb, whenever needed. The index finger and middle finger will likewise rest on segment 24. The alternative key 23 is placed slightly above the position of the index finger such that it can be easily reached and operated by that finger.

Figure 4:
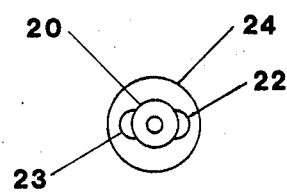
FIG. 4 is a cross-sectional view of the keypointer taken along line 4—4 of FIG. 3.
Figure 5:
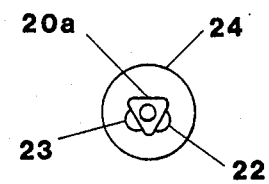
FIG. 5 is an alternative embodiment of the keypointer shown in FIG. 4.

As shown in FIG. 4, the keypointer can be provided with a round cross-sectional barrel portion 20, with the keys being diametrically opposed on the sides of its circular periphery. Alternatively, the keypointer can be provided with a triangular cross-sectional barrel portion as at 20a in FIG. 5, with the keys on neighboring sides. This may be more comfortable to hold and the two sets of keys would be somewhat easier to operate. However, such an arrangement must be made individually for right-handed or left-handed users, while the symmetrical arrangement shown in FIG. 4 can be used in either hand.

The basic function of any of the three keys, 21, 22, and 23, is to close a circuit and establish an electric contact when depressed, and break the circuit when released. However, the shift key 21 in particular, must withstand normal holding pressure of the thumb up to a certain point before allowing its intended contact to take place. This is required because of its position on the keypointer and the likelihood of accidental contact by the thumb.

Figure 6:
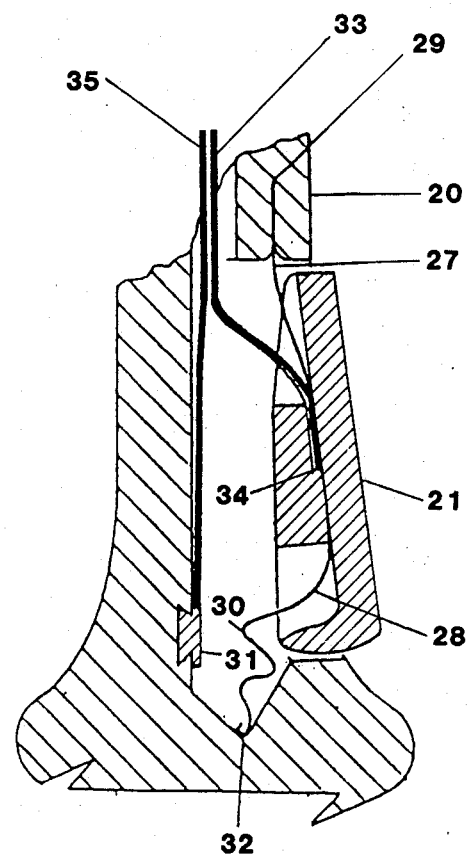
FIG. 6 is a partial longitudinal sectional view of the present invention taken along line 6—6 of FIG. 3.

In order to provide this capability the shift key may incorporate a double spring action. One spring constantly pushes the keytop out, while another spring provides positive resistance against displacement of the keytop, up to a certain point. After this point is reached, the positive resistance changes to negative resistance beyond that point. FIG. 6 illustrates an enlarged cross-sectional view of an exemplary shift key in which this principle is incorporated. The key 21 is firmly attached to a metallic spring strip that comprises two segments, 27 and 28. Segment 27, is fixed at one end 29 in the barrel of the keypointer 20, provides the positive resistance that pushes the key 21 constantly outward. This keeps the electric contact points 30, and 31 in an open position. The spring segment 28 can be provided with a pivoting end that rests in a furrow 32 in the body of the keypointer. The distance between the points 29 and 32 is fixed and the spring segments 27 and 28, are arched between them. When the key 21 is pressed inward, the spring segment 28 becomes loaded and it develops an increasing resistance against further displacement. This compliments the action of segment 27. But, when the key is forced approximately 75% of the way inward, the compressing tension in segment 23 reaches its maximum, and further movement of the key inward will be assisted by decompression of this segment.

The double spring action noted above provides a good controlling mechanism for operation of any of the keypointer keys and, at the same time, provides a feedback mechanism for feeling exactly when contact is made. After a contact between the metallic points 30 and 31 is established, the pressure of a finger on the key can be relaxed, allowing for the overriding action of spring segment 27 to push the key back to its normal open position.

As shown in FIG. 6, the spring segment 28 is in direct contact with electric wire 33 at point 34. Contact point 31 is electrically attached to wire 35, such that when the circuit is closed, the predetermined function of the key (such as a shift key) is activated and the key functions on the keyboard changed accordingly.

The mechanism described above for the shift key can be employed in the functions of the control key 22 and the alternative key 23. However, the springs used in these keys can be less stiff, thereby providing electric contact with only a light touch of a finger.

The wires leading to the keys 21, 22, and 23 are drawn out through the upper end of the key pointer, as shown in FIG. 3, and connected flexibly either to the keyboard or to the computer. An optional circuit may be provided for each of the keypointer keys for activating an audio or visual signal that indicates the particular key function is activated. For example, closure of the shift key circuit on the keypointer can be adapted to energize a second circuit which activates a light emitting diode (LED) 43, positioned above the keyboard. When the keypointer shift key is released, the LED 43 is extinguished. LED's of different colors may be used for different keys.

The switch mechanism described above for the shift key is only one example of one possible embodiment of the present invention. For instance the switching mechanism for the shift key, control key, and the alternative key on the keypointer may be of the capacitance inductive type, which does not require direct metallic contact. However, the positioning and the movement control of the keys, in particular the insensitivity of the shift key to finger pressure below a certain level, can be important for proper functioning of the present invention.

The pointing tip 36 of the keypointer is at any convenient distance from the segment 24, such is about 1.5" to 2.0", and is specially made of hard rubber.

In operation, the user places the miniaturized keyboard 5 in a convenient location and grasps the keypointer 40 in one hand. Rather than typing with the fingers, the tip 36 of the keypointer is used to depress the keyboard keys, and when an alternate key function is desired, the appropriate predetermined keypointer key (21, 22 or 23) is depressed either prior to or while depressing the keyboard key. Each of the keypointer keys can be provided with a complimentary "lock" key on the keyboard, such that the appropriate alternate key function may be locked in for extended typing without the necessity of having the particular keypointer key depressed. In this manner, one can type single handedly on a miniaturized keyboard occupying much less space than would a conventional keyboard.

I claim:

1. In a data entry system having a keyboard provided with a plurality of keys to be depressed by an operator, such keyboard being electronically connected to a data processing device and a readout and data storage device, the improvement comprising:
    a. a keyboard of reduced size, the size being such that the fingers of an operator are too large to adequately distinguish between individual keys of said keyboard, a plurality of said keys each having at least two separate and distinct functions;
    b. a hand-held pen-like key pointer for depressing individual keys of said keyboard;
    c. said keypointer electrically connected to the keyboard, and being provided with a ,plurality of keys which when depressed by the operator s fingers, provide separate and distinct functions for said keyboard keys when depressed; and
    d. the keyboard configured to send
        (i) a first signal to the data processing device when a keyboard key is depressed by the keypointer; and
        (ii) a second signal to the data processing device when a keypointer key is depressed as a keyboard key is depressed by the keypointer.

2. The device as recited in claim 1, wherein the surface dimensions of said keyboard are about 1.5"×5.5".

3. The device as recited in claim 1, wherein each key on said keyboard having a surface and is surrounded on all sides by support walls, said support walls extending upwardly above the key surface to provide a restraining barrier to prevent unintentional slippage of the keypointer to an adjacent key.

4. The device as recited in claim 1, wherein said keypointer is provided with a shift key and said keyboard is provided with a shift lock key, such that when the keypointer shift key and keyboard shift lock key are depressed, alternate functions are provided for all of said keyboard keys for extended data entry.

5. The device as recited in claim 4, wherein said keypointer is provided with additional finger-operable keys, such as a control key and an alternative key.

6. The device as recited in claim 1, wherein the keyboard is provided with a lock key to permanently lock in the alternate function associated with said keypointer keys.

7. The device as recited in claim 1, wherein said keypointer keys are provided with a double spring apparatus such that positive resistance to deplacement, after a preset amount of displacement, changes to a negative resistance to displacement, such that said positive resistance to displacement prevents inadvertent depression of said keypointer keys.

8. The device as recited in claim 1, wherein said keyboard is provided with an audio and visual signal which is activated upon said keypointer key activation.

9. The device as recited in claim 1, wherein the keypointer is provided with a barrel section having a triangular cross section.

10. The device as recited in claim 9, wherein the keypointer keys are disposed on adjacent sides of said barrel section.

11. In a data processing device in which a keyboard having a plurality of keys with at least two separate and distinct functions is operable solely by use of a remote hand-operable keypointer device, the improvement comprising:
    a. said keyboard electronically connected to said data processing device for displaying and storing the data function indicated by the keyboard key depressed by the keypointer;
    b. the hand-operable keypointer comprising a pen-like keypointer electronically connected to the keyboard and operable to depress individual keys of the keyboard;
    c. the keypointer provided with a plurality of keys which when depressed by the operator s fingers, provide separate and distinct functions for the keyboard keys when depressed; and d. the keyboard configured to send
   (i) a first signal to the data processing device when a keyboard key is depressed by the keypointer; and
   (ii) a second signal to the data processing device when a keypointer key is depressed as a keyboard key is depressed by the keypointer.

12. The device as recited in claim 11, wherein each key on said keyboard having a surface and is surrounded on all sides by support walls, said support walls extending upwardly above the key surface to provide a restraining barrier to prevent unintentional slippage of the keypointer to an adjacent key.

13. The device as recited in claim 11, wherein the keypointer is provided with a shift key and the keyboard is provided with a shift lock key.

14. The device as recited in claim 11, wherein the keyboard is provided with a lock key to permanently lock in the alternate function of any of said keypointer keys.

15. In a data entry system having a keyboard provided with a plurality of keys to be depressed by an operator, such keyboard being electronically connected to a data processing device and a readout and data storage device, the improvement comprising:

a. a keyboard of reduced size, the size being such that the fingers of an operator are too large to adequately distinguish between individual keys of said keyboard, a plurality of said keys each having at least two separate and distinct functions;

b. a hand-held pen-like key pointer for depressing individual keys of said keyboard;

c. said keypointer electrically connected to the keyboard, and being provided with a ,plurality of keys which when depressed by the operator s fingers, provide separate and distinct functions for said keyboard keys when depressed; and d. the keys of said keyboard being surrounded on all sides by support walls, said support walls extending upwardly above the key surface to provide a restraining barrier to prevent unintentional slippage of the keypointer to an adjacent key.

16. The device as recited in claim 15, wherein said keypointer is provided with a shift key and said keyboard is provided with a shift lock key, such that when the keypointer shift key and keyboard shift lock key are depressed, alternate functions are provided for all of said keyboard keys for extended data entry.

17. The device as recited in claim 15, wherein said keypointer is provided with additional finger-operable keys, such as a control key and an alternative key.

18. The device as recited in claim 15, wherein said keyboard is provided with an audio and visual signal which is activated upon said keypointer key activation.

* * * * *